March 8, 1966  F. D. McDONALD  3,238,664
TOY AIRCRAFT WITH BUILT-IN FUEL TANK
Filed Aug. 27, 1963
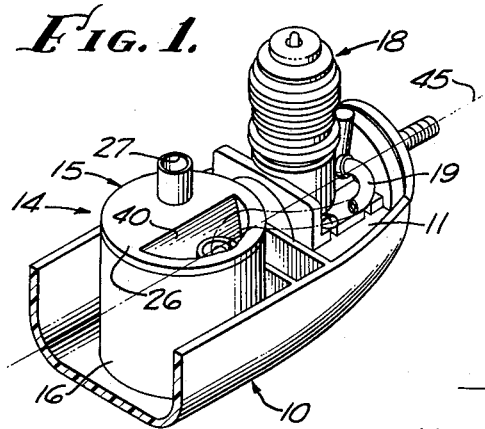
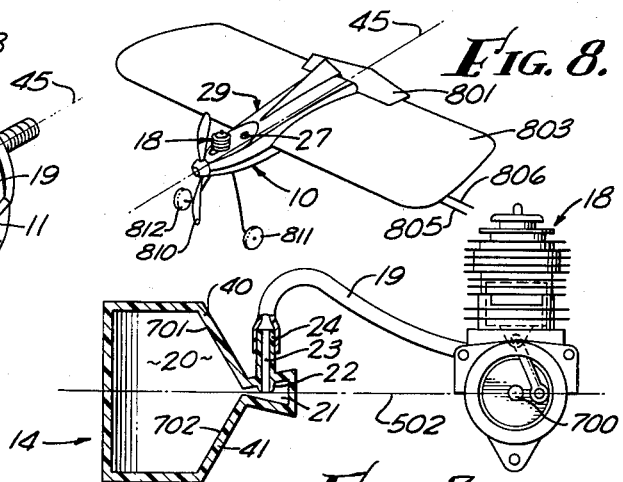
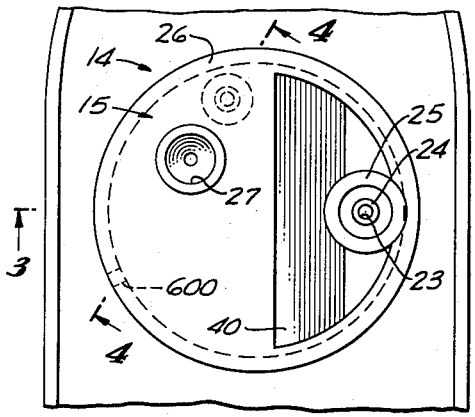
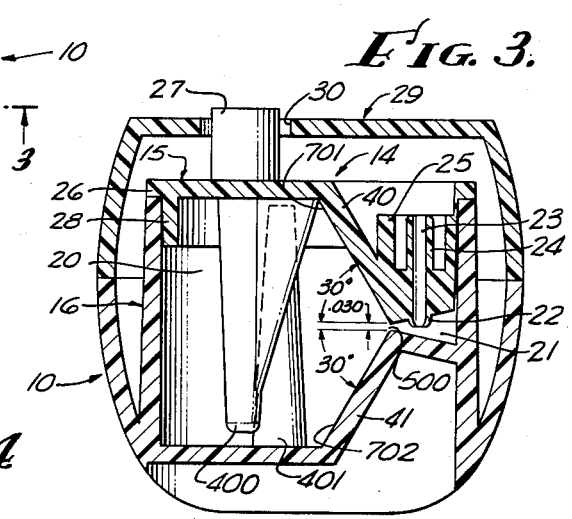
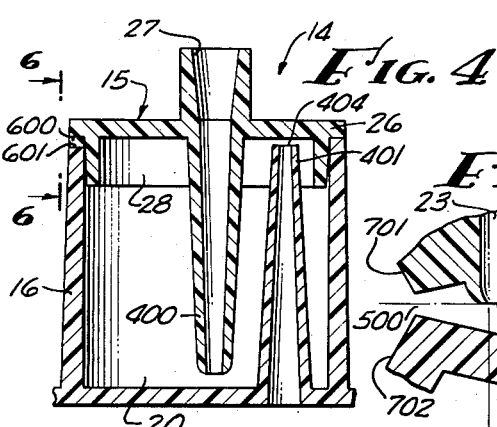
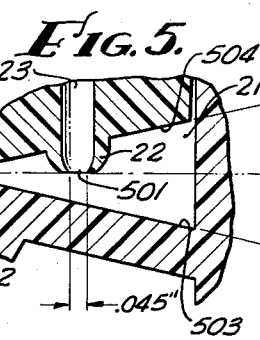
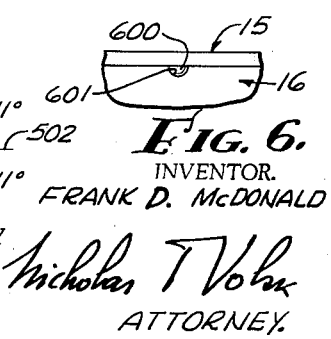
INVENTOR.
FRANK D. McDONALD
BY
Nicholas T. Volk
ATTORNEY.

United States Patent Office 3,238,664
Patented Mar. 8, 1966

3,238,664
TOY AIRCRAFT WITH BUILT-IN FUEL TANK
Frank D. McDonald, Los Angeles, Calif., assignor, by mesne assignments, to American Machine & Foundry Company, New York, N.Y., a corporation of New Jersey
Filed Aug. 27, 1963, Ser. No. 304,830
3 Claims. (Cl. 46—77)

This invention relates to toy aircraft with a fuel tank molded directly into the fuselage of the toy plane, and more particularly, to the so-called stunt aircraft and "stunt fuel tanks" used in connection with stunt toy airplanes capable of stunt flying, including the "upside down" flying, i.e., the normally upper and lower surfaces of the airplane become reversed in their position with respect to ground.

Such upside down operation of the stunt toy airplanes requires special fuel tanks. The fuel tanks, under such flying conditions, should be capable of feeding fuel to the engine and also retain the fuel irrespective of the position of the tank in space. Such fuel tanks are known in the art as "stunt tanks." Stunt tanks of the prior art are tiny tin cans having special vents and tubes for feeding special fuels—a mixture of alcohol and castor oil—into the single piston internal combustion engines of toy airplanes. Thus, the fuel tanks in general, and the stunt tanks as well, of the prior art are separate components which are attached to the fuselage or the back plate of the engine and connected to the engine through a suitable valve.

According to the invention, the fuel tank is made an integral part of the fuselage and special air and fuel vents, ducts, chambers, and shapes are imparted to the tank and its component parts to make it perform the intended function and also to make it an integral part of the fuselage of the stunt aircraft.

It is an object of this invention to provide a fuel tank for a toy aircraft which is an integral part of a molded fuselage and is molded into the front portion of the fuselage so as to be positioned as closely as possible to the engine and on the same level as the engine.

It is an additional object of this invention to provide a molded stunt tank having a main fuel chamber with two vent tubes and two inclined surfaces terminating in a narrow slot opening into an auxiliary chamber, and an outgoing fuel duct connecting the auxiliary chamber to the engine.

Referring to the drawings:

FIGURE 1 is a perspective view of the tank, engine and the front lower half of the fuselage with the upper half of the fuselage removed;

FIGURE 2 is a plan view of the tank and the lower half of the fuselage walls adjacent to the tank;

FIGURE 3 is a vertical transverse section of the tank and fuselage walls in the plane passing through line 3—3 shown in FIG. 2;

FIGURE 4 is a vertical sectional view of the tank taken along line 4—4 shown in FIG. 2;

FIGURE 5 is an enlarged transverse section of the auxiliary chamber which is an integral part of the fuel tank;

FIGURE 6 is a side view of that portion of the tank which is provided with an indexing detent between the tank cover and the tank;

FIGURE 7 is a diagrammatic section of the tank and the end view of the engine illustrating the relative positions of the two with respect to each other;

FIGURE 8 is an overall perspective view of the airplane.

Referring to the drawings, FIG. 8 illustrates the overall view of a stunt toy aircraft having a single wing 803, a rudder 801, a fuselage having an upper half 29 and a lower half 10, an engine 18, a propeller 810, two landing gear wheels 811 and 812 and two strings 805 and 806 for controlling the position of rudder 801. A built-in fuel tank 14, FIG. 1, constitutes an integral part of the lower half 10 of the fuselage as illustrated in FIG. 1. The tank has a funnel 27 projecting through an opening 30, FIG. 3, of the upper fuselage 29, this funnel also being illustrated at 27 in FIG. 8.

FIGURE 1 is a perspective view of the front portion of the lower half 10 of the fuselage which includes a seat 11 for the engine 18 and the stunt tank 14 located directly behind the engine. Tank 14 includes an upper part 15 and a lower part 16. The upper part 15 is a separately injection molded piece which is mounted on and is cemented to the lower part 16. The lower part 16 is an integral part of the lower half 10 of the fuselage and comprises a single injection-molded piece including the lower half 10 of the fuselage and the lower half 16 of the tank. The upper part 15 and the lower part 16 are provided with an indexing detent 600 and mating recess 601 for proper positioning of the upper half 15 on top of the lower half 16.

The engine 18 is connected to the tank 14 by means of a hose 19 in the manner illustrated in FIGS. 1 and 7. As also illustrated in FIG. 7, the tank is provided with the main chamber 20 and an auxiliary chamber 21. The auxiliary chamber is also illustrated on an enlarged scale in FIG. 5. The auxiliary chamber, the cross-sectional view of which is also illustrated in FIG. 3, is provided with a nipple 22 and an outgoing fuel duct 23 terminating in a hose connector 24 countersunk in a boss 25, FIG. 3, projecting upwardly from the upper member 15.

As illustrated in FIG. 4, which is a vertical sectional view taken in plane 4—4 illustrated in FIG. 2, the tank is provided with two air vent tubes 400 and 401, the air vent tube 401 being an integral part of the lower member 16 and air vent 400 being an integral part of the upper member 15. The air vent 400 projects beyond the upper cover 26 and forms a funnel 27 which is used for filling the tank with fuel. Cover 26 is provided with a flange 28 and detent 600. As illustrated in FIG. 3, funnel 27 projects beyond the upper member 29 of the fuselage and the upper member 29 of the fuselage is provided with an opening 30 for this purpose. The upper and lower members of the tank are provided with two flat, inclined walls 40 and 41 which form a slot 500. Since the two inclined inner surfaces of the walls 40 and 41 act as a centrifugal force funnel for the fuel in order to keep the auxiliary chamber constantly filled with the fuel, it is necessary for these two surfaces 701 and 702, FIG. 7, to be in two planes which are parallel to the longitudinal axis 45 of the aircraft. In this manner the centrifugal force will be most effective for forcing the fuel into the auxiliary chamber and keep the auxiliary chamber filled with the fuel. Axis 502, therefore, for optimum operation, should be at 90° to axis 45. Slot 500 constitutes a slot which interconnects the main chamber 20 with the auxiliary chamber 21 along the entire length of the walls 40 and 41. Slot 500 and the two inclined walls 40 and 41 act as a centrifugal force funnel for keeping the auxiliary tank 21 constantly filled with fuel when the plane is in operation, and there is a centrifugal force which conveys the fuel either over wall 40 or wall 41, or both, from the main chamber 20 to the auxiliary chamber 21 through slot 500. The fuel is then conveyed through nipple 22, duct 23 and hose 19 to engine 18. The mouth 501 of the nipple is located directly at the center line 502 of the auxiliary tank. Center line 502 also passes through the mid-portion of slot 500 and through the center 700 of the crank shaft. The auxiliary chamber is provided with two inclined outwardly diverging walls 503 and 504 which are symmetrically disposed with respect to the center line 502 and form 11° angles with the center line 502. The width of slot 500, in one specific example described here, is equal to 0.30". The diameter of the nipple opening, in this example, is equal to 0.45", and the angle formed by the wall members 40 and 41 with the center line 502 is equal to 30°, as illustrated in FIG. 3. All of the above dimensions are critical dimensions when considered in connection with the specific engine, such as an .049 engine used in connection with the tank, these dimensions and the rate of the fuel consumption of the engine combining to produce a workable combination which is capable of functioning effectively irrespective of the position of the fuel tank in space during the stunt flying of the airplane.

The overall perspective view of the plane, using the described stunt tank and fuselage, is illustrated in FIG. 8. A wing 803 is mounted between the upper half 29 and the lower half 10 of the fuselage with the wing going through the fuselage members and with the fuselage members 29 and 10 being clamped over the central portion of wing 803. A rudder 801 is mounted at the downstream end of the lower member 10 and strings 805 and 806 are used for controlling the position of rudder 801 through a bell crank, which is not visible in FIG. 8.

From the description of FIG. 8, as well as from what is shown in FIG. 1, it can be seen that the stunt tank 14 is mounted directly behind engine 18, with the disance between the engine 18 and the tank 14 being reduced to a minimum so as to reduce the difference in the elevation of the engine and of the tank with respect to each other when the toy aircraft assumes various positions, including the vertical position.

The operation of the stunt tank should be apparent from the description given thus far. The tank is filled with fuel through funnel 27, and since, at this time, the tank is in the position illustrated in FIGS. 4 and 3, the tank can hold fuel up to the level 404, FIG. 4, which is the mouth of the air vent pipe 401. It is preferable to fill the tank to the level which is slightly below the mouth 404 of the air vent 401. Thereafter, the fuel tank will not lose any fuel irrespective of its position since if it assumes a position at which the air vents are covered with fuel, there is no loss of fuel because the engine crank shaft prevents the entry of air into the crank shaft.

What I claim is:

1. A line-controlled, self-propelled model airplane system comprising a model airplane and control lines leading from one side thereof toward a pivotal station for manual guidance of the airplane during circular flight primarily in one direction, said airplane further comprising: a fuselage and wing structure, an internal combustion engine mounted on said structure and driving a propeller, a fuel tank within said structure, said fuel tank having a relatively smaller auxiliary chamber communicating with its main chamber through an outlet port, said auxiliary chamber being located radially outwardly from said main chamber at the side thereof opposite said one side, the inside walls of said auxiliary chamber diverging outwardly from said port, whereby fuel is centrifugally forced toward said port and into said auxiliary chamber, and a fuel line connecting said auxiliary chamber and engine.

2. A line-controlled, self-propelled model airplane system comprising a model airplane and control lines leading from one side thereof toward a pivotal station for manual guidance of the airplane during circular flight primarily in one direction, said airplane further comprising: a fuselage and wing structure, an internal combustion engine mounted on said structure and driving a propeller, a fuel tank within said structure, said fuel tank having a relatively smaller auxiliary chamber communicating with its main chamber through an outlet port, said auxiliary chamber being disposed radially outwardly from said main chamber at the side thereof opposite said one side, the inside walls of said main chamber converging toward said port, and the inside walls of said auxiliary chamber diverging outwardly from said port, whereby fuel is centrifugally fed through said port, and into said auxiliary chamber, and a fuel line connecting said auxiliary chamber and engine.

3. The invention according to claim 2, wherein said fuel tank, including the main chamber and auxiliary chamber, is an integral part of said fuselage.

References Cited by the Examiner

UNITED STATES PATENTS

| 2,710,651 | 6/1955 | Hanson | 244—135 X |
| 2,824,406 | 2/1958 | Vanderschel | 46—78 |
| 2,917,866 | 12/1959 | Ullmann | 46—111 X |
| 2,942,375 | 6/1960 | Bucic | 46—7 |
| 3,004,739 | 10/1961 | Bunting et al. | 46—78 X |
| 3,059,879 | 10/1962 | Tatone | 46—78 X |

RICHARD C. PINKHAM, *Primary Examiner.*